United States Patent

Sano et al.

[11] Patent Number: 5,858,563
[45] Date of Patent: Jan. 12, 1999

[54] ORGANIC ELECTROLUMINESCENT DEVICE

[75] Inventors: Takeshi Sano, Hirakata; Takanori Fujii, Sumoto; Yuji Hamada, Kadoma; Kenichi Shibata, Hashimoto; Kazuhiko Kuroki, Uji, all of Japan

[73] Assignee: Sanyo Electric Co., Ltd., Osaka, Japan

[21] Appl. No.: 604,038

[22] Filed: Feb. 20, 1996

[30] Foreign Application Priority Data

Feb. 24, 1995 [JP] Japan .................................. 7-061238

[51] Int. Cl.⁶ .................................................. H05B 33/00
[52] U.S. Cl. ........................ 428/690; 428/917; 313/504
[58] Field of Search ............................ 313/504; 428/690, 428/917

[56] References Cited

U.S. PATENT DOCUMENTS

| | | | |
|---|---|---|---|
| 3,654,525 | 4/1972 | Maricle et al. | 317/230 |
| 3,816,795 | 6/1974 | Maricle et al. | 315/246 |
| 4,769,292 | 9/1988 | Tang et al. | 428/690 |
| 5,449,564 | 9/1995 | Nishio et al. | 428/690 |
| 5,601,903 | 2/1997 | Fujii et al. | 428/212 |

OTHER PUBLICATIONS

Patent Abstracts of Japan, vol. 17, No. 327 (C–1073) re Japanese Publication No. 05–032966, published Feb. 9, 1993.

Patent Abstracts of Japan, vol. 18, No. 442 (E–1593) re Japanese Publication No. 06–136359 published May 20, 1994.

*Primary Examiner*—Charles Nold
*Attorney, Agent, or Firm*—Merchant, Gould, Smith, Edell, Welter & Schmidt

[57] ABSTRACT

In an organic electroluminescent device according to the present invention, at least a luminescent layer using an organic material is provided between a hole injection electrode and an electron injection electrode, and a luminescent material composed of a condensed polycyclic aromatic compound having condensed rings each having a benzene ring as a basic unit the number of which is in the range of 2 to 10, along with an organic material having hole transporting characteristics, is contained as the organic material in the luminescent layer.

6 Claims, 2 Drawing Sheets

ORGANIC ELECTROLUMINESCENT DEVICE

BACKGROUND OF THE INVENTION

1. Field of the Invention

The present invention relates generally to an organic electroluminescent device having at least a luminescent layer using an organic material provided between a hole injection electrode and an electron injection electrode, and more particularly, to an organic electroluminescent device capable of emitting light efficiently at a low voltage and stably over a long time period.

2. Description of the Prior Art

In recent years, the needs of plane display devices the consumed power and the spatial occupied area of which are smaller than those of a CRT which has been conventionally generally employed have been increased as information equipments are diversified, for example, whereby an electroluminescent device (hereinafter referred to as an EL device) has been paid attention to as one of the plane display devices.

The EL device is roughly divided into an inorganic EL device using an inorganic material and an organic EL device using an organic material depending on the used material.

The inorganic EL device is so adapted that a high electric field is generally exerted on a luminescent portion, and electrons are accelerated within the high electric field to collide with a luminescence center, whereby the luminescence center is excited to emit light.

On the other hand, the organic EL device is so adapted that electrons and holes are respectively injected into a luminescent portion from an electron injection electrode and a hole injection electrode, the electrons and the holes thus injected are recombined with each other in a luminescence center to excite an organic material, and the organic material emits fluorescence when it is returned from its excited state to its ground state.

In the inorganic EL device, a high voltage of 100 to 200 V is required as its driving voltage because a high electric field is exerted as described above. On the other hand, the organic EL device can be driven at a low voltage of approximately 5 to 20 V. Further, in the organic EL device, a device emitting light in a suitable color can be simply obtained by selecting a fluorescent material which is a luminescent material, and it is expected that the device can be also utilized as a full-color display device or the like. In recent years, various studies have been undertaken on the organic EL device.

Known examples of the organic EL device generally include ones having a three-layer structure which is referred to as a DH structure in which a hole transporting layer, a luminescent layer and an electron transporting layer are laminated between a hole injection electrode and an electron injection electrode, a two-layer structure which is referred to as an SH-A structure in which a hole transporting layer and a luminescent layer abundant in electron transporting characteristics are laminated between a hole injection electrode and an electron injection electrode, and a two-layer structure which is referred to as an SH-B structure in which a luminescent layer abundant in hole transporting characteristics and an electron transporting layer are laminated between a hole injection electrode and an electron injection electrode.

The organic EL device has the advantage that it can be driven at a lower voltage than the inorganic EL device as described above, so that it can be easily multi-colored, while having some disadvantages. For example, a voltage of approximately 5 to 20 V is still required to drive the organic EL device, and the organic EL device cannot be driven simply by a dry cell. Further, much of power which did not contribute to light emission is changed into heat. The device is degraded by the heat, whereby light is not emitted stably over a long time period.

SUMMARY OF THE INVENTION

A first object of the present invention is to provide an organic EL device capable of emitting light efficiently at a lower voltage than the conventional organic EL device.

Another object of the present invention is to provide an organic EL device which can be prevented from being degraded because of the change from power which did not contribute to light emission to heat and can emit light having high luminance stably over a long time period.

In an organic EL device according to the present invention, at least a luminescent layer using an organic material is provided between a hole injection electrode and an electron injection electrode, and a luminescent material composed of a condensed polycyclic aromatic compound having condensed rings each having a benzene ring as a basic unit the number of which is in the range of 2 to 10, along with an organic material having hole transporting characteristics, is contained as the organic material in the luminescent layer.

As in the organic EL device, when the luminescent material composed of a condensed polycyclic aromatic compound having condensed rings each having a benzene ring as a basic unit the number of which is in the range of 2 to 10, along with the organic material having hole transporting characteristics, is contained in the luminescent layer, holes are efficiently injected into the luminescent layer. The holes thus injected are transported by the organic material having hole transporting characteristics, and the luminescent material efficiently emits light by recombination of the holes and electrons injected into the luminescent layer.

In the organic EL device, a material having a large work function such as gold or ITO (an indium-tin oxide) is preferably used for the hole injection electrode. An electrode material having a small work function such as magnesium is preferably used for the electron injection electrode. In order to take out light emitted in the luminescent layer, at least one of the electrodes must be made transparent. Transparent ITO having a large work function is generally used for the hole injection electrode.

Furthermore, in the organic EL device according to the present invention, a luminescent material having a naphthacene structure indicated by the following chemical formula 1, a rubrene structure indicated by the following chemical formula 2, or a decacyclene structure indicated by the following chemical formula 3 is preferably used as the luminescent material composed of a condensed polycyclic aromatic compound which is contained in the luminescent layer. If such a luminescent material is used, light having high luminance can be emitted more efficiently at a low voltage and stably over a long time period.

[Chemical formula 1]

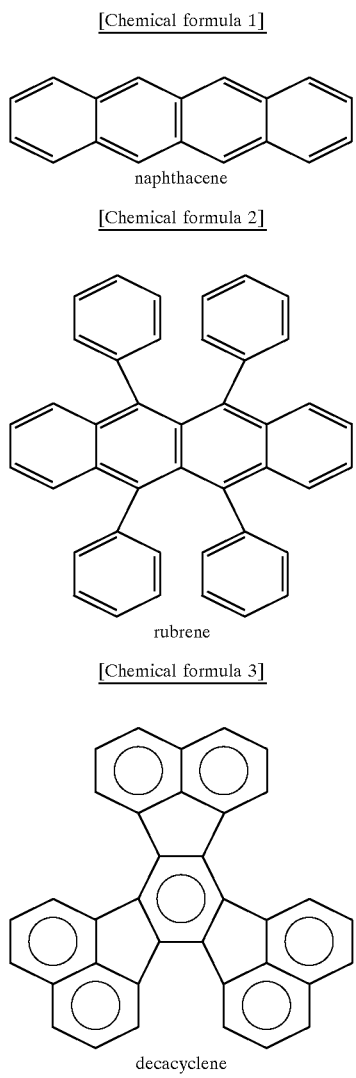

Additionally, in the organic EL device according to the present invention, a diamine derivative indicated by the following chemical formula 4 is preferably used as the organic material having hole transporting characteristics which is contained in the luminescent layer. When such a diamine derivative is used for the luminescent layer, holes are more efficiently injected into the luminescent layer. The holes thus injected are efficiently transported by the diamine derivative. The luminescent material emits light more efficiently by recombination of the holes and the electrons injected into the luminescent layer.

[Chemical formula 4]

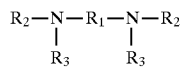

R1 in the foregoing chemical formula 4 is any one of aromatic groups indicated by the following chemical formula 5, and R2 or R3 in the foregoing chemical formula 4 is any one of aromatic groups indicated by the following chemical formula 6. R2 and R3 may be the same or different from each other.

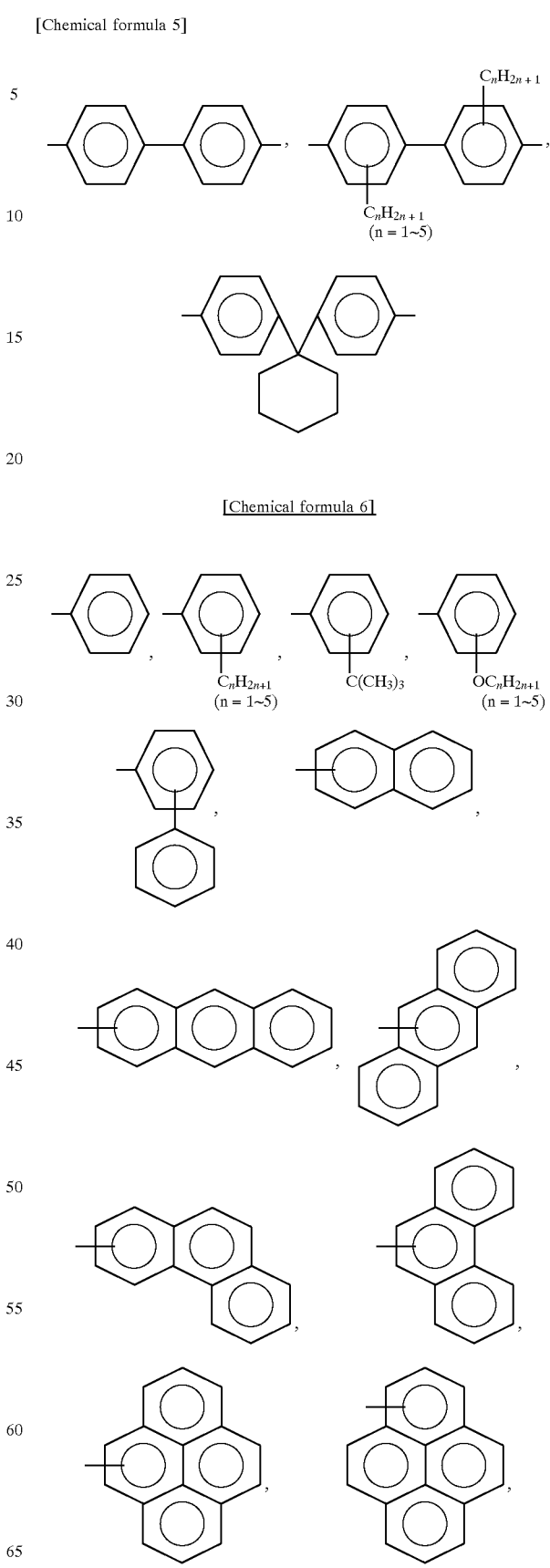

-continued
[Chemical formula 6]

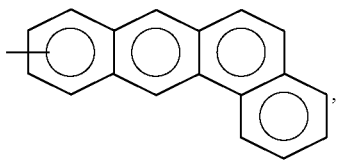

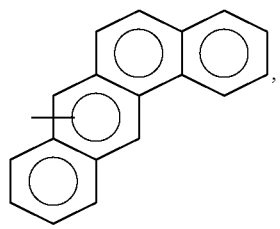

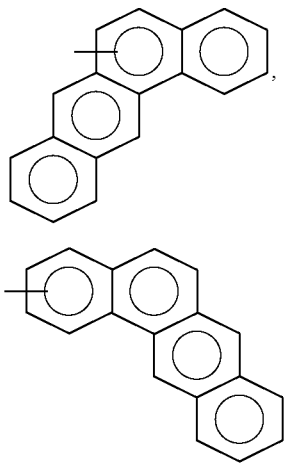

The organic EL device according to the present invention may have a structure in which at least the above-mentioned luminescent layer is provided between the hole injection electrode and the electron injection electrode. In order to emit light efficiently at a lower voltage to emit light stably over a long time period, it is preferable that the organic EL device has the above-mentioned SH-B structure in which an electron transporting layer composed of an organic material having a minimum conduction band level lower than that of the luminescent layer and having the electron transporting capability is provided on the side of the electron injection electrode, or the above-mentioned DH structure in which in addition to the electron transporting layer, a hole transporting layer composed of an organic material having an ionization potential smaller than that of the luminescent layer and having the hole transporting capability is provided on the side of the hole injection electrode so that holes are efficiently injected into the luminescent layer.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Organic EL devices according to embodiments of the present invention will be specifically described on the basis of attached drawings and comparative examples will be taken, to clarify that the organic EL devices in the present embodiments can emit light efficiently at a low voltage and emit light stably over a long time period.

Embodiment 1

Figure 1:
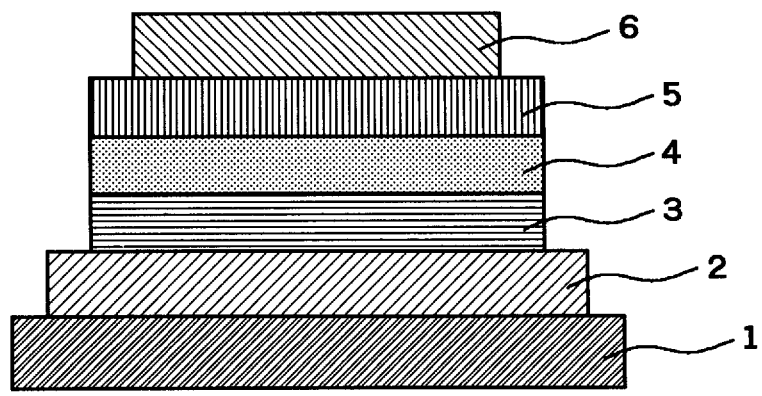
FIG. 1 is a schematic view showing the structures of organic EL devices in embodiments 1 to 11 of the present invention and comparative examples 1 and 2.

An organic EL device in the present embodiment has a DH structure in which a transparent hole injection electrode 2 having a thickness of 1000 Å composed of ITO, a hole transporting layer 3 having a thickness of 400 Å composed of a triphenylamine derivative (m-MTDATA) indicated by the following chemical formula 7, a luminescent layer 4 having a thickness of 400 Å in which 5% by weight of the rubrene indicated by the foregoing chemical formula 2 is doped as a luminescent material into a diamine derivative indicated by the following chemical formula 8, an electron transporting layer 5 having a thickness of 400 Å composed of (10-Hydroxybenzo[h]quinolinate)beryllium complex (BeBq2) indicated by the following chemical formula 9, and an electron injection electrode 6 having a thickness of 2000 Å composed of a magnesium-indium alloy (Mg: In=9:1) are successively formed on a glass substrate 1, as shown in FIG. 1.

[chemical formula 7]

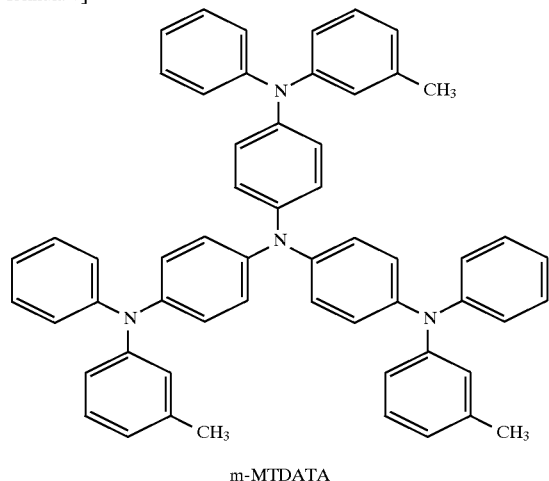

m-MTDATA

[chemical formula 8]

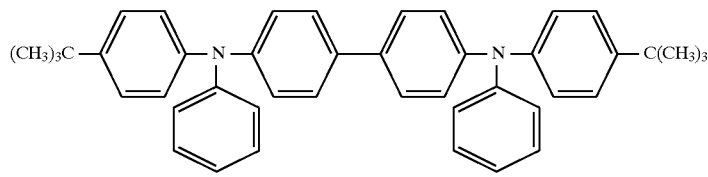

[chemical formula 9]

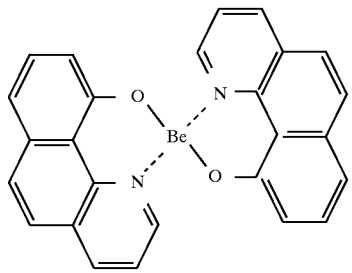

BeBq$_2$

Description is now made of a method of fabricating an organic EL device according to the present embodiment.

First, a hole injection electrode 2 was formed using ITO on a glass substrate 1, the glass substrate 1 on which the hole injection electrode 2 is formed was cleaned by a neutral detergent, and was then ultrasonically cleaned, respectively, in acetone for twenty minutes and in ethanol for twenty minutes. The glass substrate 1 was put in boiled ethanol for approximately one minute and was taken out, after which the glass substrate 1 was dried by ventilation. Thereafter, the above-mentioned m-MTDATA was vacuum evaporated on the hole injection electrode 2, to form a hole transporting layer 3. The above-mentioned diamine derivative and rubrene were further co-evaporated on the hole transporting layer 3, to form a luminescent layer 4, after which the above-mentioned BeBq2 was vacuum evaporated on the hole transporting layer 3, to form an electron transporting layer 5. The evaporation was performed by a resistance heating and evaporating method under conditions such as a degree of vacuum of $1\times10^{-5}$ Torr, a substrate temperature of 20° C., and an evaporation speed of 2 Å/sec. An electron injection electrode 6 composed of a magnesium-indium alloy was formed on the electron transporting layer 5.

Embodiments 2 to 9

Each of organic EL devices according to the embodiments 2 to 9 also has the same DH structure as that of the organic EL device according to the above-mentioned embodiment 1. The organic EL devices in the embodiments are obtained in the same manner as that in the first embodiment 1 except that only the type of the diamine derivative used for the luminescent layer 4 in the organic EL device in the embodiment 1 is changed.

A diamine derivative indicated by the following chemical formula 10 in the embodiment 2, a diamine derivative indicated by the following chemical formula 11 in the embodiment 3, a diamine derivative indicated by the following chemical formula 12 in the embodiment 4, a diamine derivative indicated by the following chemical formula 13 in the embodiment 5, a diamine derivative indicated by the following chemical formula 14 in the embodiment 6, a diamine derivative indicated by the following chemical formula 15 in the embodiment 7, a diamine derivative indicated by the following chemical formula 16 in the embodiment 8, and a diamine derivative indicated by the following chemical formula 17 in the embodiment 9 are

[Chemical formula 10]

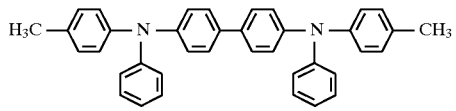

[Chemical formula 11]

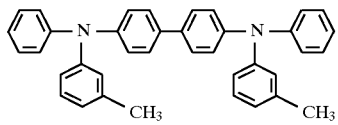

[Chemical formula 12]

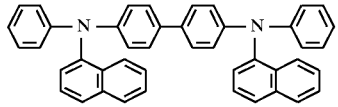

[Chemical formula 13]

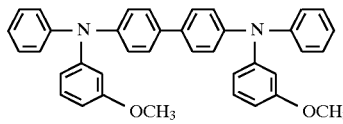

[Chemical formula 14]

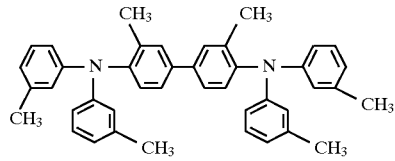

[Chemical formula 15]

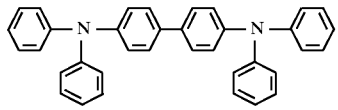

[Chemical formula 16]

[Chemical formula 17]

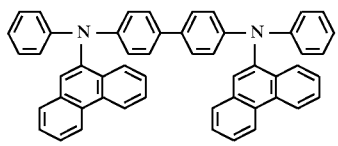

Embodiments 10 and 11

Each of organic EL devices according to the embodiments 10 and 11 also has the same DH structure as that of the organic EL device according to the above-mentioned embodiment 1. The organic EL devices in the embodiments are obtained in the same manner as that in the embodiment 1 except that only the material used for the luminescent layer 4 in the organic EL device in the embodiment 1 is changed.

5% by weight of the naphthacene indicated by the foregoing chemical formula 1 was doped as a luminescent material into the diamine derivative indicated by the foregoing chemical formula 11 in the embodiment 10, and 5% by weight of the decacyclene indicated by the foregoing chemical formula 3 was doped as a luminescent material into the diamine derivative indicated by the foregoing chemical formula 11 in the embodiment 11, to respectively form luminescent layers 4 having a thickness of 400 Å.

Embodiment 12

Figure 2:
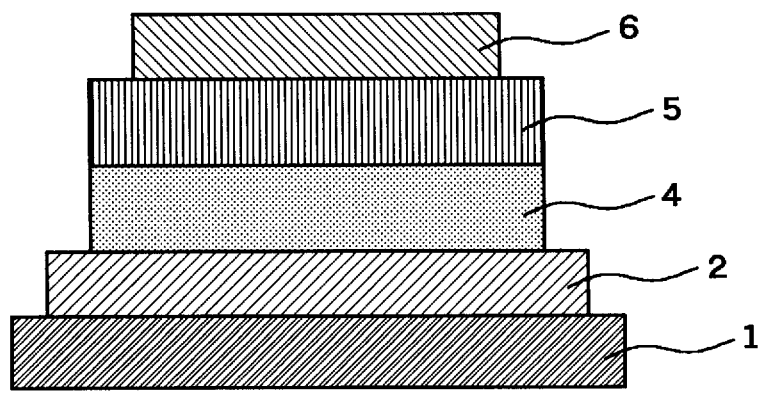
FIG. 2 is a schematic view showing the structures of organic EL devices in embodiments 12 and 13 of the present invention.

In the present embodiment 12, the hole transporting layer 3 in the organic EL device in the above-mentioned embodiment 1 is not provided, to obtain an organic EL device having an SH-B structure by forming a transparent hole injection electrode 2 having a thickness of 1000 Å composed of ITO on a glass substrate 1, then forming a luminescent layer 4 having a thickness of 500 Å in which 5% by weight of the rubrene indicated by the foregoing chemical formula 2 is doped as a luminescent material into the diamine derivative indicated by the foregoing chemical formula 8, and then successively forming an electron transporting layer 5 having a thickness of 500 Å composed of the BeBq2 indicated by the foregoing chemical formula 9 and an electron injection electrode 6 having a thickness of 2000 Å composed of a magnesium-indium alloy (Mg: In=9:1) on the luminescent layer 4, as shown in FIG. 2.

Embodiment 13

An organic EL device according to the present embodiment has the same SH-B structure as that of the organic EL device according to the above-mentioned embodiment 12. In the present embodiment, the organic EL device is obtained in the same manner as that in the above-mentioned embodiment 12 except that only the material used for the electron transporting layer 5 in the organic EL device in the embodiment 12 is changed, to form an electron transporting layer 5 using tris(8-quinolinol)aluminum complex (Alq3) indicated by the following chemical formula 18.

[Chemical formula 18]

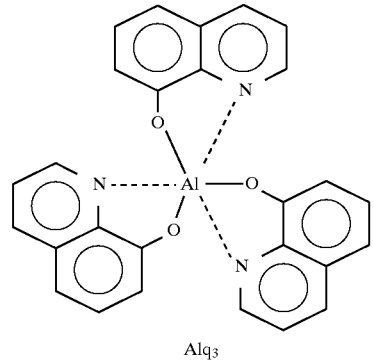

Alq3

Comparative Examples 1 and 2

Organic EL devices in the comparative examples have the same DH structure as that of the organic EL device according to the above-mentioned embodiment 1. In the comparative examples, the organic EL devices are obtained in the same manner as that in the embodiment 1 except that only the material used for the luminescent layer 4 in the organic EL device in the embodiment 1 is changed.

5% by weight of 4-(dicyanomethylene)-2-methyl-6-(p-dimethylaminostyryl)-4H-pyrane (DCM) indicated by the following chemical formula 19 which has been conventionally known is doped into the diamine derivative indicated by the foregoing chemical formula 11 in the comparative example 1, and 5% by weight of coumarin 343 indicated by the following chemical formula 20 is doped into the diamine derivative indicated by the foregoing chemical formula 11 in the comparative example 2, to respectively form luminescent layers 4 having a thickness of 400 Å.

[Chemical formula 19]

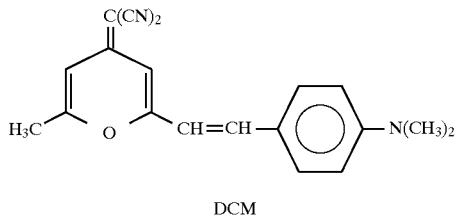

DCM

[Chemical formula 20]

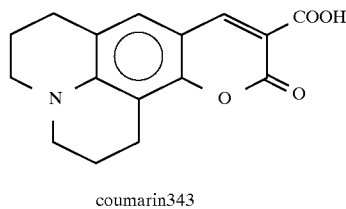

coumarin343

Comparative Example 3

Figure 3:
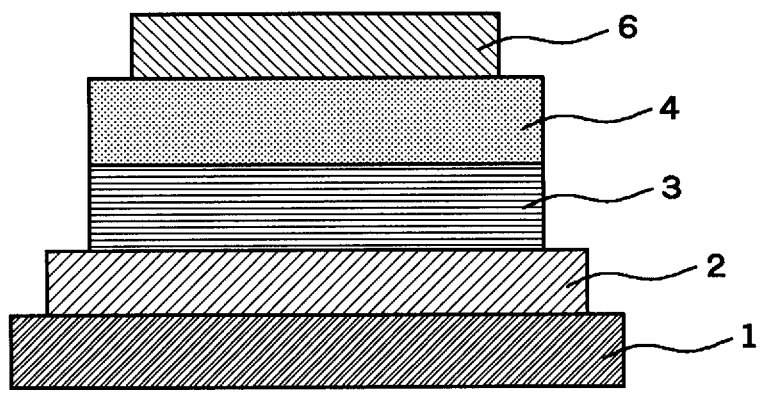
FIG. 3 is a schematic view showing the structure of an organic EL device in a comparative example 3.

In the comparative example, an organic EL device having an SH-A structure in which a transparent hole injection electrode 2 having a thickness of 1000 Å composed of ITO, a hole transporting layer 3 having a thickness of 500 Å composed of the diamine derivative indicated by the foregoing chemical formula 8, a luminescent layer 4 having a thickness of 500 Å composed of the Alq3 indicated by the foregoing chemical formula 18, and an electron injection electrode 6 having a thickness of 2000 Å composed of a magnesium-indium alloy (Mg: In =9:1) are successively formed on a glass substrate 1 is fabricated, as shown in FIG. 3.

When a positive voltage and a negative voltage are respectively applied to the hole injection electrode 2 and the electron injection electrode 6 in each of the organic EL devices in the embodiments 1 to 13 and in the comparative examples 1 to 3, and the relationship between an applied voltage, luminance and a current value, to find maximum luminance, maximum luminous efficiency, and a voltage for obtaining luminance of 1 cd/m² (an emission starting voltage) in the organic EL device. In addition, each of the organic EL devices is continuously driven under predetermined current conditions in dry air, and the change in luminance is examined, to find time elapsed from the initial luminance of 500 cd/m² until the luminance is reduced to half, that is, 250 cd/m² (initial luminance half-time) in the organic EL device. The results are shown in the following Table 1.

TABLE 1

| | maximum luminance cd/m | maximum luminous efficiency 1 m/W | emission starting voltage V | initial luminance half-time hr |
|---|---|---|---|---|
| embodiment 1 | 57700 | 16.1 | 2.4 | 2200 |
| embodiment 2 | 53200 | 12.1 | 2.4 | 600 |
| embodiment 3 | 60600 | 14.4 | 2.7 | 3500 |
| embodiment 4 | 71000 | 9.0 | 3.4 | 4000 |
| embodiment 5 | 22400 | 9.7 | 3.1 | 300 |
| embodiment 6 | 33000 | 8.2 | 3.2 | 450 |
| embodiment 7 | 49000 | 10.1 | 3.0 | 1800 |
| embodiment 8 | 21000 | 7.5 | 3.4 | 300 |
| embodiment 9 | 31000 | 8.0 | 3.5 | 1100 |
| embodiment 10 | 24000 | 7.5 | 3.1 | 600 |
| embodiment 11 | 38000 | 8.0 | 2.9 | 900 |
| embodiment 12 | 42000 | 10.0 | 2.6 | 1200 |
| embodiment 13 | 35000 | 8.5 | 3.0 | 189 |
| comparative example 1 | 8500 | 0.9 | 6.0 | 75 |
| comparative example 2 | 14000 | 1.5 | 5.1 | 20 |
| comparative example 3 | 15800 | 1.6 | 5.0 | 21 |

As apparent from the results, in the organic EL device in each of the embodiments, the maximum luminance and the maximum luminous efficiency are significantly higher, the emission starting voltage is significantly lower, and the initial luminance half-time is significantly longer, as compared with those in the organic EL device in each of the comparative examples, whereby light can be emitted efficiently at a low voltage, and light having high luminance can be emitted stably over a long time period.

Although in each of the organic EL devices in the embodiments, an example in which the naphthacene indicated by the chemical formula 1, the rubrene indicated by the chemical formula 2, and the decacyclene indicated by the chemical formula 3 are used as the luminescent material in the luminescent layer 4 is only illustrated, the luminescent material in the luminescent layer 4 is not limited to the same. For example, a material which is a combination of suitable substitutional groups may be used as the luminescent material, provided that it is a compound having a naphthacene structure, a rubrene structure or a decacyclene structure. Also in this case, the same effect as that in each of the above-mentioned embodiments is obtained. It is considered that the same effective results are obtained even when a condensed polycyclic aromatic compound having condensed rings each having a benzene ring as a basic unit the number of which is in the range of 2 to 10, for example, perylene, coronene, anthracene, benzanthracene, quinacridone, phenanthrene, chrysere and pyrene in addition to above-mentioned rubrene, naphthacene and decacyclene.

Furthermore, the diamine derivative used for the luminescent layer 4 is not limited to that in each of the above-mentioned embodiments. Any diamine derivative indicated by the foregoing chemical formula 4 may be used.

Although in each of the organic EL devices in the above-mentioned embodiments, an example in which the BeBq2 indicated by the foregoing chemical formula 9 or the Alq3 indicated by the foregoing chemical formula 18 are used as a material composing the electron transporting layer 5 for introducing electrons into the luminescent layer 4 is only illustrated, the material composing the electron transporting layer 5 is not particularly limited to the same. For example, a benzoquinolinol metal complex, a quinolinol metal complex, an oxadiazole derivative, or the like can be also used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An organic electroluminescent device having at least a luminescent layer using an organic material between a hole injection electrode and an electron injection electrode, wherein a luminescent material composed of a dopant that is a condensed polycyclic aromatic compound having condensed rings, each having a benzene ring as a basic unit the number of which is in the range of 2 to 10, and a diamine derivative indicated by the following chemical formula 4, is present in the luminescent layer

[Chemical formula 4]

$$R_2-N(R_3)-R_1-N(R_3)-R_2$$

where R1 in the foregoing chemical formula 4 is any one of aromatic groups indicated by the following chemical formula 5,

[Chemical formula 5]

where R2 in the foregoing chemical formula 4 is any one of aromatic groups (a)–(p) in the following chemical formula 6, R3 in the foregoing formula 4 is any one of aromatic groups (b)–(d) in the following chemical formula 6, and R2 and R3 may be the same or different from each other

[Chemical formula 6]

-continued (l) 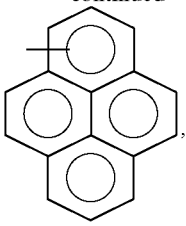, (m) 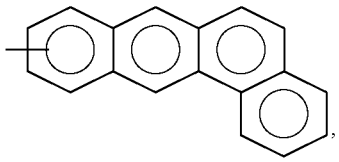, (n) 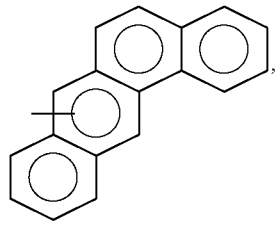, (o) 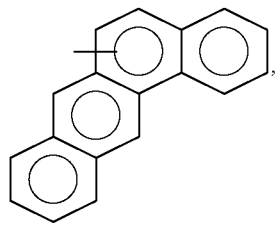, (p) 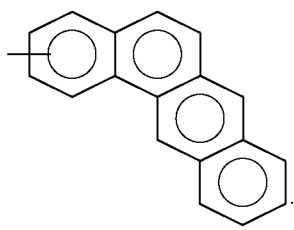.

2. The organic electroluminescent device according to claim 1, wherein said luminescent material composed of a condensed polycyclic aromatic compound which is contained in the luminescent layer has a naphthacene structure.

3. The organic electroluminescent device according to claim 1, wherein said luminescent material composed of a condensed polycyclic aromatic compound which is contained in the luminescent layer has a rubrene structure.

4. The organic electroluminescent device according to claim 1, wherein said luminescent material composed of a condensed polycyclic aromatic compound which is contained in the luminescent layer has a decacyclene structure.

5. The organic electroluminescent device according to claim 1, wherein a carrier transporting layer using an organic material is provided in addition to said luminescent layer between the hole injection electrode and the electron injection electrode.

6. The organic electroluminescent device according to claim 1, wherein a hole transporting layer using an organic material, said luminescent layer, and an electron transporting layer using an organic material are provided between the hole injection electrode and the electron injection electrode.

* * * * *